United States Patent Office 3,136,730
Patented June 9, 1964

3,136,730
PRODUCTION OF POLYMERS CONTAINING ALTERNATING PHENYLENE GROUPS AND SILICON ATOMS
Alexander Marshall Meston, Saltcoats, Scotland, assignor to Imperial Chemical Industries Limited, London, England, a corporation of Great Britain
No Drawing. Filed Feb. 13, 1961, Ser. No. 88,610
Claims priority, application Great Britain Feb. 26, 1960
5 Claims. (Cl. 260—2)

This invention relates to polymeric materials and more particularly to a new and improved process for the production of certain polymeric materials containing silicon.

A wide variety of polymeric materials containing silicon are known and many of these are widely used because of their valuable and advantageous properties. One class of polymer which has not hitherto been widely used is that in which the basic chain structure is formed by a series of alternating phenylene groups and silicon atoms, i.e. the so-called silphenylene polymers. These polymers have been prepared by a variety of methods. All of the methods hitherto available have, however, suffered from one or more serious disadvantages. Thus, in some cases, the use of high temperatures is necessary, while others require high pressures and in some cases, materials of irregular structure are obtained. In general, the hitherto available processes have resulted only in low yields of the desired materials.

An object of the present invention is to provide a new and improved process for the production of silphenylene polymers. Another object is to provide such a process which can be easily and economically operated and which will give good reproducibility. Other objects will appear hereinafter.

According to the present invention, these objects are accomplished by a process comprising reacting together, in the presence of a solvent, an organolithium compound of the general formula RLi, wherein R is an alkyl group having at least 2 and not more than 10 carbon atoms, and a compound of the general formula

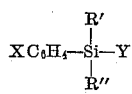

wherein R' and R", which may be the same or different, are alkyl, aryl, alkaryl, aralkyl or alkenyl groups having at least 2 and not more than 20 carbon atoms, X is bromine or iodine, Y is chlorine, bromine, iodine or an alkoxy group and the group —$C_6H_4$— is a meta- or para-phenylene group.

The group R in the organolithium compound may be any alkyl group having at least 2 and not more than 10 carbon atoms. Suitable alkyl groups include, for example, ethyl, propyl and butyl groups. It is, however, in general preferred that R should be an n-butyl group.

A wide variety of halophenyldiorganosilanes may be used in the process of our invention. Thus X may be bromine or iodine, but is preferably bromine; and Y may be chlorine, bromine, iodine, an alkoxy group or any other organo group which can be reacted with an organolithium compound to give interchange of the group attached to lithium. The groups R' and R", which may be the same or different may be, for example, alkyl groups such as tertiary butyl groups, aryl groups such as phenyl or substituted phenyl groups, alkaryl groups such as tolyl groups, aralkyl groups such as benzyl groups or alkenyl groups such as vinyl or allyl groups. It is, however, generally preferred that they should be aryl groups, and compounds in which R' and R" are both phenyl groups are particularly preferred.

A wide variety of solvents may be used in the process of our invention, it being necessary only that the solvent be relatively inert to the reactants used and that it be liquid at the reaction temperature. Suitable solvents which may be used include, for example, ethers and aliphatic or aromatic liquid hydrocarbons. Ethers are, in general, preferred and diethyl ether is particularly preferred.

The reaction may be carried out within a wide temperature range, for example, for about —100° C. to about 100° C. It is, however, normally preferred to operate at temperatures within the range —75° C. to 30° C.

The products of our invention are extremely valuable because of their high thermal stability which renders them suitable for use in a wide variety of applications, for example, such as heat-resistant plastics, thermally stable lubricants and the like.

An important advantage of our process is that products of regular structure can be readily reproduced, thus ensuring that the desired product is always obtained by the same process.

Our invention is further illustrated by the following examples in which all parts and percentages are by weight.

*Example 1*

50 parts of p-bromophenyl-chloro-diphenylsilane were dissolved in 1,000 parts of dry diethyl ether and the mixture fed into a reacton vessel equipped with stirring means and which had previously been flushed with nitrogen. 8.6 parts of n-butyl-lithium dissolved in 100 parts of pentane were added to the mixture at 15° C. while stirring. A heavy white precipitate appeared. After 20 minutes 200 parts of water were added to decompose any residual unreacted n-butyl-lithium and the white precipitate filtered off. The polymer so obtained was either insoluble or nearly so in boiling water, ether, chloroform, ethanol and n-butanol. This material was further purified by extraction with boiling n-butanol followed by heating at 200° C. and 15 mm. pressure for 4 hours whereby low molecular weight impurities were removed by sublimation. The so-purified polymer melted at about 360 to 380° C. to a brown liquid which, on cooling, gave an amber, brittle, glassy solid. This material was found to be of value as a component of thermally resistant surface coatings.

*Example 2*

373 parts of p-bromophenyl-chloro-diphenylsilane dissolved in 7,500 parts of sodium dried diethyl ether were fed into a reaction vessel cooled to —75° C. and which had previously been flushed with nitrogen. There was then slowly added to the reaction vessel, 62 parts of n-butyl-lithium in 1,000 parts of n-hexane. A clear solution was obtained which became cloudy on slow warming at —26° C. and thereafter disposited a heavy precipitate of polymer and inorganic lithium salt. The reaction mixture was stirred for 18 hours at 15° C. after which the suspension gave a negative Gilman colour test (Gilman and Schulze J.A.C.S., 1925, 27, 2002) showing that the reaction was complete. The precipitate was filtered off, washed with dilute hydrochloric acid, and boiled with acetone after which the resulting fine suspension was poured into dilute hydrochloric acid. The solid was then separated and boiled for 30 minutes with n-butanol which dissolved a small amount of material. The undissolved white solid was washed with methanol and dried at 100° C. The purified product so obtained gave, on analysis; C, 81.5; H, 6.09 and Si, 10.97 percent. The theoretical analysis for the polymer ($C_6H_4SiPh_2$—)$_n$ is C, 83.73; H, 5.43 and Si, 10.85 percent. The polymer softened at about 375° C. and melted just above 400° C. On heating a sample in the atmosphere for 6 hours at 300° C. no change was perceptible. This polymer was found to be suitable for use as a component of thermally resistant surface coatings.

Example 3

186.8 parts of p-bromophenyl-chloro-diphenylsilane dissolved in 2,000 parts of dry benzene were fed into a reaction vessel. 31 parts of n-butyl-lithium dissolved in 500 parts of benzene were passed into the reaction vessel while stirring. During the addition the temperature was maintained at 15° C. After 5 hours the solution had developed a faint cloudiness and after 1 week a Gilman colour test was negative. The white solid precipitate which had deposited was then filtered off and purified in the manner described in Example 1. The white polymeric solid finally obtained melted at 280 to 300° C. and was almost completely soluble in boiling xylene. After re-crystallisation from xylene the product was found to have the analysis C, 78.24; H, 6.13 and Si, 9.23 percent.

Example 4

40 parts of dibenzyl-p-bromophenyl chlorosilane dissolved in 1000 parts of diethyl ether were placed in a reaction vessel and cooled to −75° C. There was then gradually added 6.2 parts of n-butyl-lithium dissolved in 100 parts of n-pentane. The solution was slowly warmed and became cloudy at −12° C. After 2 hours at 15° C. a negative Gilman colour test was obtained. Water was added to the reaction mixture given two clear layers and the ether layer separated, washed and dried. On removal of the ether by distillation, there remained a pale yellow viscous oil which on crystalliation from n-butanol gave white crystals of melting point about 60° C. A sample purified by being thrice re-crystallised from n-butanol was found to have a molecular weight of 2,600 (measured by an ebullioscopic method in benzene).

Example 5

186.8 parts of p-bromophenyl-chloro-disphenylsilane dissolved in 1,000 parts of dry tetrafuran were placed in a reaction vessel at 15° C. To this, there was then added while stirring, 31 parts of n-butyl-lithium dissolved in 600 parts of n-pentane. A white precipitate was formed immediately and after 2 hours a Gilman test was negative. The polymer so obtained was isolated and purified by the method described in Example 2 giving 126 parts of a white solid. After extraction with xylene, 87 parts of an insoluble polymer were obtained. This melted at 390 to 400° C. The polymer so obtained was found to be suitable for use as a component of thermally resistant surface coatings.

What I claim is:

1. A process for the production of thermally resistant, resinous, silphenylene polymers which comprises reacting together, in the present of a solvent that is relatively inert to the reactants used, an organo-lithium compound of the general formula RLi, wherein R is an alkyl group having at least 2 and not more than 10 carbon atoms, and a compound of the general formula

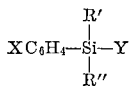

wherein R′ and R″ are selected from the group consisting of alkyl, aryl, alkaryl, aralkyl and alkenyl groups having at least 2 and not more than 20 carbon atoms, X is selected from the group consisting of bromine and iodine, Y is selected from the group consisting of chlorine, bromine, iodine and an alkoxy group and the group —C₆H₄— is selected from the group consisting of a meta- and para-phenylene group, said reaction being carried out at a temperature ranging of from about −100° C. to about 100° C.

2. A process as claimed in claim 1 wherein the compound RLi is n-butyl-lithium.

3. A process as claimed in claim 1 wherein R′ and R″ are both phenyl groups.

4. A process as claimed in claim 1 wherein the solvent is diethyl ether.

5. A process as claimed in claim 1 wherein the temperature is from about −75° to about 30° C.

References Cited in the file of this patent

UNITED STATES PATENTS 2,483,972    Goodwin _____ Oct. 4, 1949

OTHER REFERENCES

Sommer et al.: Journal, American Chemical Society, volume 71, pages 2746–9 (1949).

Lewis et al.: Journal, American Chemical Society, volume 74, pages 2931–3 (1952).

Gilman et al.: Journal, American Chemical Society, volume 72, pages 1689–91 (1950).

Wittenberg et al.: Journal, American Chemical Society, volume 80, pages 2677–80 (1958).